Inventor
Robert H. Davies
By
Mason, Porter, Diller & Stewart
Attorneys

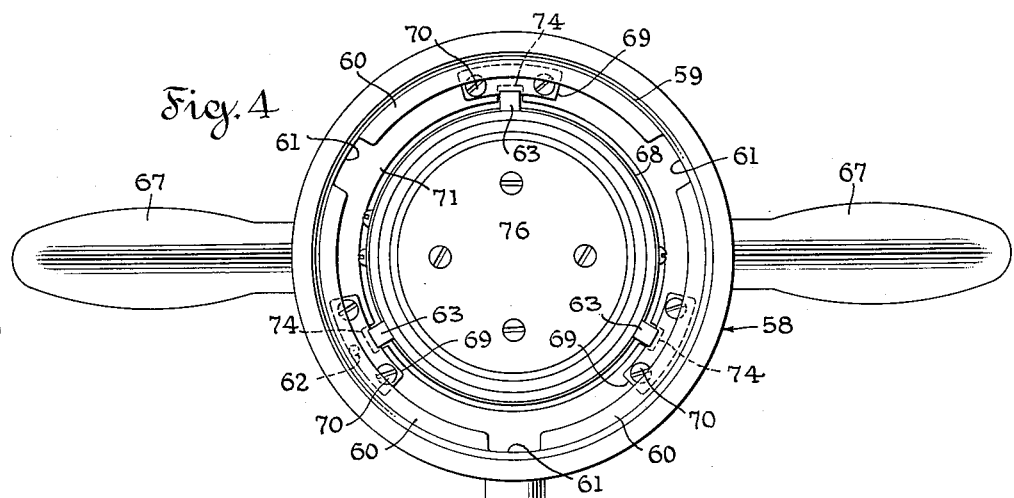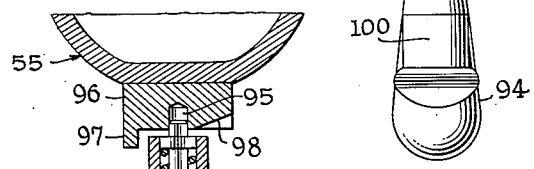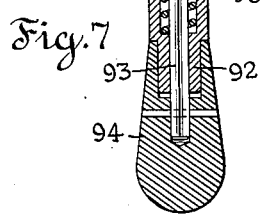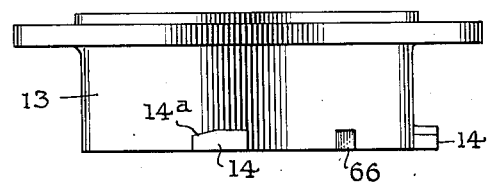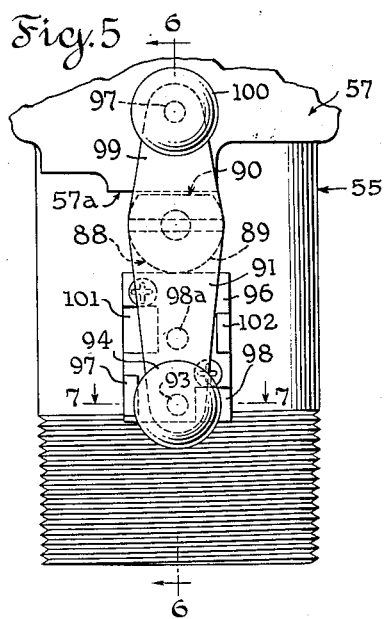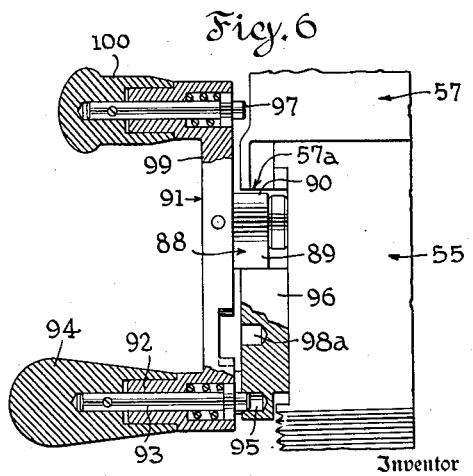

Patented Mar. 10, 1953

2,630,822

UNITED STATES PATENT OFFICE 2,630,822

VALVE MEANS FOR CONTROLLING THE FILLING AND DRAINING OF TANKS

Robert H. Davies, Bedford, Ohio, assignor to The Parker Appliance Company, Cleveland, Ohio, a corporation of Ohio Application May 29, 1947, Serial No. 751,488

10 Claims. (Cl. 137—235)

The invention relates to new and useful improvements in an attachment for tanks for filling or emptying and draining the same.

An object of the invention is to provide an attachment of the above type which includes a housing having a common valve controlled inlet or outlet passage wherein the housing has valve controlled ports through which the tap is filled and an independent port through which the tank may be emptied and drained.

A further object of the invention is to provide an attachment of the above type wherein the valve controlling the inlet ports of the housing is fluid controlled and has means associated therewith for closing the ports when the tank is filled to a pre-determined degree.

A further object of the invention is to provide an attachment of the above type wherein the valve controlling the draining port in the housing is held closed when there is fluid pressure present in the housing and which automatically opens to drain the tank when there is no fluid pressure in the housing bearing on said valve.

Another object of the invention is to provide an attachment of the above type wherein the valve controlling the inlet port of the housing and the valve controlling the flow of fluid through the nozzle are so disposed that when the nozzle is attached to the housing, these valves are substantially in contact, thus preventing any pocket which might be filled with fluid and wasted when detaching the nozzle.

A still further object of the invention is to provide an attachment of the above type wherein the valve for controlling the inlet or outlet passage may be manually opened by devices associated with a nozzle adapted to be attached to the housing.

A further object of the invention is to provide an attachment of the above type wherein the means for manually opening and closing the valve includes a valve adapted to close the passage leading from the nozzle and wherein said nozzle is provided with means for preventing the opening of the nozzle valve until the nozzle has been secured to the housing by a sealed connection.

A still further object of the invention is to provide an attachment of the above type wherein there is means associated with the nozzle for preventing the detachment of the same from the housing until the nozzle valve has been fully seated.

These and other objects will in part be obvious and will in part be hereinafter more fully described.

In the drawings:

Figure 4 is an end view of the nozzle removed from its connection to the housing;

Figure 4a is a detail showing a portion of the depending sleeve on the housing to which the nozzle is attached and showing the lug to which the nozzle is secured and also the slot which prevents the nozzle sleeve from turning during the locking of the same to the housing;

Figure 5 is a side view of a portion of the nozzle and showing the crank for opening and closing the nozzle valve and also the locking means therefor;

Figure 6 is a longitudinal view on the line 6—6 of Figure 5; and

Figure 7 is a longitudinal view on the line 7—7 of Figure 5.

The improved attachment includes a housing which is adapted to be attached to a wall of the tank. The housing is preferably disposed within the tank and connected to the bottom wall thereof. The housing has an opening at the lower side thereof which is surrounded by a valve seat and an inwardly opening valve is normally spring pressed against the seat. The housing has an upper and lower section. In the upper section there are ports leading to the tank and a fluid pressure controlled valve closes these ports and separates the upper portion of the housing from the lower portion thereof. The lower portion of the housing has a port through which the tank may be drained and associated with this port is a valve which opens into the housing and is normally held closed by the fluid pressure in the lower portion of the housing. The upper portion of the housing is closed except for a pipe connection which leads to a pilot valve at the upper side of the tank. This pilot valve operates in conjunction with the fluid pressure valve controlling the inlet ports so as to close the ports when the tank is filled.

A nozzle carried by a hose is adapted to be connected in sealed engagement with the lower end of the housing. Within this nozzle is a valve for closing the passage leading through the nozzle. The valve opens outwardly and is so positioned and dimensioned that when the valve is moved to open position, it will contact the valve controlling the filling and draining passages at the lower part of the housing and move the same to open position. There is a means associated with the nozzle for manually opening the valve and there is also a means associated with the nozzle which prevents the opening of the nozzle valve until the nozzle is firmly in sealed engagement with the housing, and there is likewise a means for preventing the detachment of the nozzle from the housing until the nozzle valve has been moved to full seated position.

Figure 1:
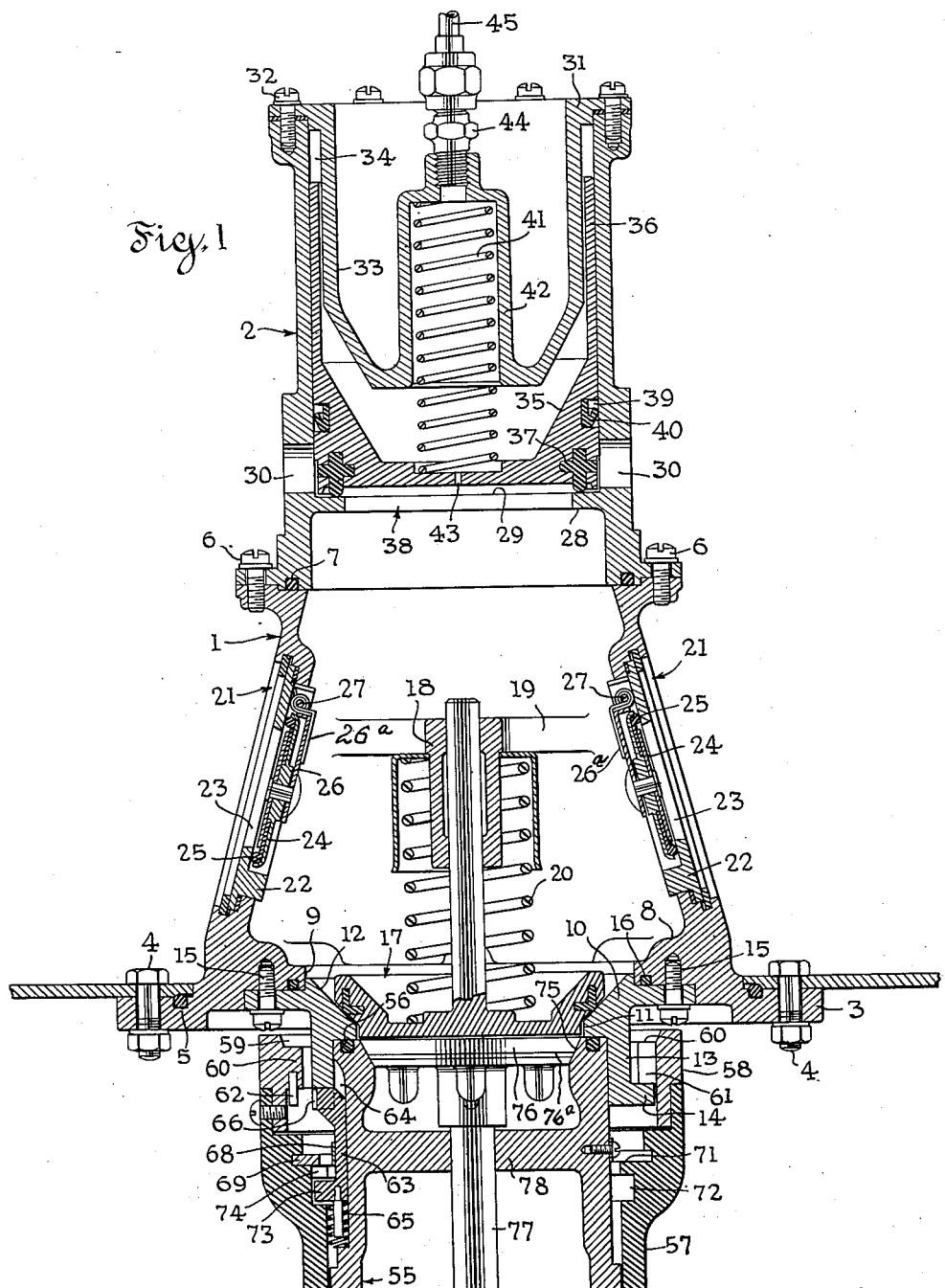
Figure 1 is a vertical sectional view through a housing and a portion of a nozzle embodying the improvements.

Referring more in detail to the drawings, the improved attachment for filling and draining a tank includes a housing formed, as shown in Figure 1, in two sections, a lower section 1 and an upper section 2. The lower section 1 has a laterally extending flange 3 which, as shown, is attached to the bottom wall of the tank. There is an opening in the bottom wall through which the housing extends and the housing is secured to the tank wall by bolts 4, 4. Between the wall of the tank and the housing is a sealing gasket 5. The upper section 2 is secured to the lower section 1 by suitable bolts 6, 6 and there is a sealing gasket 7 between the sections.

The lower section 1 of the housing has an inwardly projecting portion 8 terminating in an opening 9. Attached to the under side of this inwardly projecting portion 8 is an annular member 10 having a passage 11 therethrough and this passage 11 is surrounded on the upper face of said member 10 by an inclined face 12 forming a valve seat. This annular member 10 has a depending sleeve 13 carrying projecting lugs 14, 14 to which a nozzle may be attached, as will be hereinafter more fully described.

The annular member 10 is secured to the under side of the inwardly projecting portion 8 by suitable bolts 15, 15 and there is a gasket 16 which seals the connection between the housing and the annular member 10. The passage 11 is a common passage for filling or draining the tank. This passage is controlled by a valve 17 which is mounted for vertical movement in a sleeve 18 carried by a spider 19 which is preferably formed integral with the housing. A spring 20 normally moves the valve into engagement with the seat and the passage is opened when the valve is raised from its seat.

Preferably in the side wall of the lower section of the housing are openings 21. Mounted in each opening is an annular member 22 having a port 23 through which the tank may be emptied and drained. A valve 24 provided with a sealing gasket 25 serves as a means for closing each port 23. Each valve is mounted on an arm 26 hinged at 27 and the connection between the arm and the valve permits the valve to make firm sealing connection to the valve seat surrounding the port 23. The valve is initially closed by means of a spring 26ª. When there is no fluid pressure on the chamber in the lower section of the housing, the fluid pressure of the tank bearing against these valves 24 will open the same and thus permit draining. However, as soon as the tank is drained, the springs will move the valves to their closed position so that when the tank is refilled, the fluid will fill this chamber of the lower section and hold the valve 24 seated against any accumulating pressure in the tank as it is filled.

The upper section 2 of the housing has an inwardly projecting ledge 28 which provides a valve seat 29 on its upper face. There are ports 30 leading from the upper portion of the housing to the tank. The upper portion of the housing is closed by a cap 31 which is bolted to the upper end of the housing 2 by suitable screws 32. This cap has a depending portion 33 extending down into the upper section 2 of the housing and the depending portion is spaced away from the wall of the housing, providing an annular space 34.

Located in the upper portion of the housing is a valve 35 provided with a skirt 36 which extends into the space 34. This skirt 36 makes sliding engagement with the inner surface of the housing 2. The valve carries an annular gasket 37 which contacts with the seat 29 and this closes the passage 38 connecting the upper and lower sections of the housing. There is also an annular recess 39 in the valve in which is located a gasket 40. Said gasket 40 has an annular portion bearing against the inner wall of the housing 2. This gasket will prevent fluid from passing from the chamber above the valve to the ports 30. The valve 35 is moved to seated position by a spring 41 which is located in a sleeve portion 42 formed integral with the cap 31. The valve 35 has a relatively small opening 43 therethrough which is open at all times and forms a connection between the chamber below the valve and the chamber above the valve.

Figure 3:
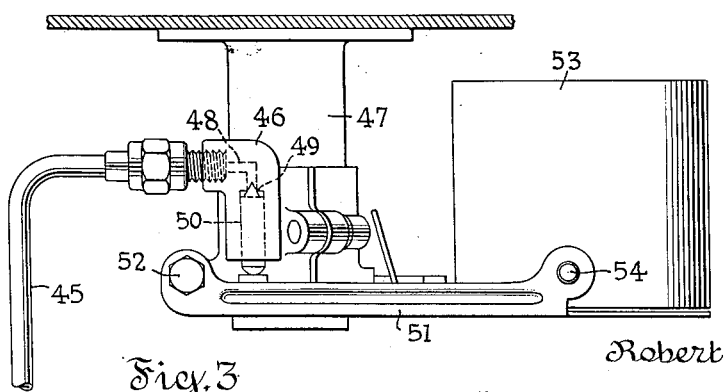
Figure 3 is a view showing more or less diagrammatically the pilot valve at the upper side of the tank and the float for controlling the same.

Attached to the upper end of the sleeve portion 42 is a nipple 44. Secured to this nipple 44 is a pipe 45 which extends to a housing 46 at the upper side of the tank. This housing 46 is mounted on a bracket 47 attached to the upper wall of the tank. There is a port 48 within the housing 46 to which the pipe is connected. This port 48 has a right angle portion terminating in a valve seat 49. Mounted in the housing for free up and down movement is a valve 50 having a tapered upper end which engages the seat 49 for closing the port 48. When the valve moves downward then the port 48 is connected to the tank. The valve 50 is raised and lowered by an arm 51 pivoted at 52 and carrying a float 53. The arm is in the form of a yoke and the float is disposed between the arms of the yoke and secured thereto by pivots 54. When the float is in raised position, as shown in full lines in Figure 3, the valve is closed and the port leading to the pipe is closed. When, however, the valve drops to its lower position, then the valve is opened and the port 48 is open to the interior of the tank.

The nozzle which is adapted to be attached to the housing for the filling or draining of the tank includes a cylindrical member 55. This cylindrical portion is so dimensioned that it fits within the depending sleeve 13. The cylindrical portion carries a gasket 56 which is adapted to engage an inwardly extending ledge surrounding the opening in the housing through which the tank is filled and drained. This makes a sealed connection between the nozzle and the housing. The nozzle also includes an outer sleeve 57 which serves as a means for attaching this cylindrical member 55 of the nozzle in sealed engagement with the housing.

The sleeve has attached to its outer end a ring shaped member 58 provided with a tapered opening 59 which facilitates the placing of the nozzle on the downwardly projecting sleeve portion of the housing. This ring shaped member has an inwardly projecting ledge 60 provided at spaced intervals, preferably 120 degrees apart, with openings 61 (see Figure 4). These openings 61 are adapted to receive the lugs 14 carried by the housing. After the lugs have been passed through these openings 61, then the sleeve is turned in a clockwise direction, as viewed in Figure 4, until the lugs are brought into contact with limiting stop 62.

In order to prevent the cylindrical inner member of the nozzle from turning on its seat when the sleeve is turned to lock the nozzle to the housing, keys 63 are provided. The key is mounted in the slot 64 in the cylindrical member 55. The key is spring pressed by springs 65 in a direction toward the sleeve 13 on the housing and this sleeve 13 on the housing is provided with a slot 66 which receives the key. There are three keys and three slots for preventing the inner sleeve from turning on the housing. These keys are shown in Figure 4. The keys are so positioned relative to the slots that when the lugs in the housing are in alignment with the slots in the nozzle, the keys on the nozzle are also in alignment with the slots in the depending sleeve member 13 of the housing. Therefore, when the lugs pass through these slots 61 to permit the movement of the cylindrical member into contact with the ledge on the housing, the keys will also enter the slots and thus hold the inner sleeve of the nozzle from turning.

The outer sleeve 57 is provided with two handles 67, 67 which may be grasped by the operator to facilitate the placing of the nozzle on the housing and then the sleeve is turned to carry the lugs underneath the inwardly projecting ledge 60. The keys 63 are retained from radial movement in the slot 64 by a metal band 68. The keys are held in the slot with a limiting longitudinal movement by plates 69, which plates are secured to the outer sleeve by means of screws 70 (see Figure 4).

The outer sleeve 57 has an inwardly projecting ledge 71 and beneath the ledge is a groove 72. The ledge is provided with slots 74. There are three slots which are in alignment with projecting portions 73 on the keys when the sleeve is in a position for the detaching of the nozzle from the tank. The projections 73 will therefore enter the slots 74 and prevent the sleeve from being turned. When, however, the nozzle is attached to the tank, the keys will enter the slots 66 and these keys and slots are so dimensioned that the seating of the inner sleeve will move the projections 73 on the keys out of the slot 74 into the groove beneath the ledge 71 so that the sleeve is free to turn to accomplish the locking of the nozzle to the tank housing. The inner sleeve 55 has a projecting portion 55ª thereon adapted to be engaged by the shoulder 57ᵇ on the outer sleeve. This enables the inner sleeve to be forced against the seat on the housing when the outer sleeve is turned. The lugs 14 have tapered portions 14ª which serve as a camming action for drawing the inner sleeve into tight engagement with the seat thereof.

The inner member 55 of the nozzle is provided with a tapered portion forming a valve seat 75. A valve 76 is adapted to engage said seat 75 and said valve is opened when it is moved out of the nozzle. The valve is mounted on a valve stem 77 which in turn is mounted for reciprocation in a spider 78 formed integral with the inner member 55 of the nozzle. The valve stem 77 is provided with an extension of reduced diameter, thus providing a shoulder 79. The valve 76 is provided with a sealing gasket 76ª.

It will be noted from Figure 1 that the valve 17 has a projection which extends into the opening 11 so that the lower face of this valve is very close to the upper face of the valve 76 and therefore there is no pocket between these two valves in which any quantity of liquid could be trapped and drained away when the nozzle is detached.

Figure 2:
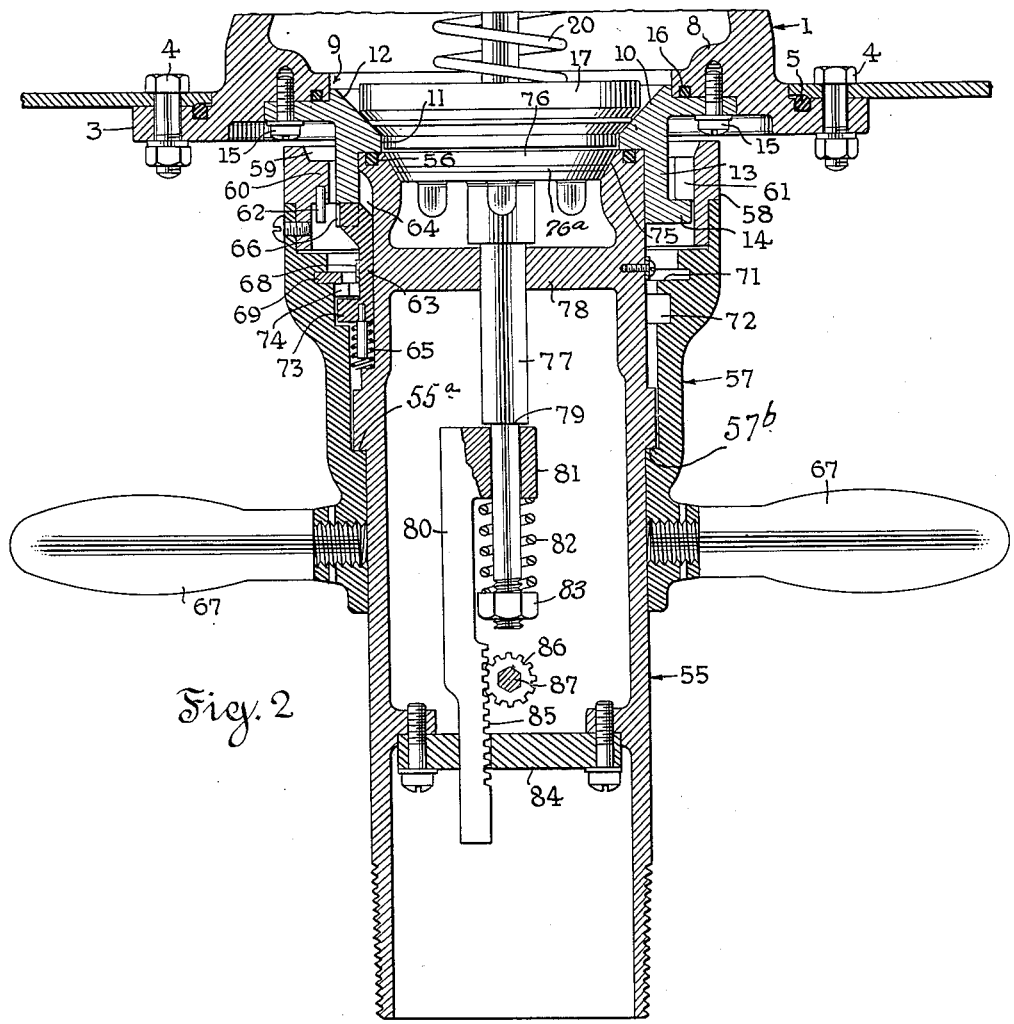
Figure 2 is a vertical sectional view through the nozzle and a portion of the housing.

A spindle 80 has an offset portion 81 provided with an opening through which the valve stem extension passes. A spring 82 abuts at one end against this offset portion 81 of the spindle and at its other end against a nut 83 threaded on the valve stem extension. There is sufficient clearance between the shoulder 79 and the portion 81, when the valve is closed, so that the spring presses the valve against its seat. The spindle 80 is mounted for reciprocation in a spider 84. Said spindle is provided with a rack 85 with which a pinion 86 meshes. The pinion 86 is mounted on a shaft 87. The shaft 87 is mounted in a bearing carried by the inner sleeve member 55. When the shaft is rotated in a clockwise direction, as shown in Figure 2, the valve 56 will be moved away from its seat and when the shaft is rotated in the opposite direction, then the valve will be brought into contact with its seat and any further movement of the shaft will compress the spring 82 and merely hold the valve firmly seated.

Mounted on the outer end of the shaft 87 is a collar 88. The collar has a semi-cylindrical portion 89 and a flat portion 90. The sleeve 57 has a laterally projecting lug with a flat face 57ª. When the flat face of the sleeve 57 is opposed to the flat face 90 of the collar 88, then the shaft 87 cannot be turned as the collar is pinned to the shaft 87. This flat portion 57ª on the sleeve is so disposed that the flat portions are in the position shown in Figure 5 when the nozzle is first attached and before the sleeve is turned for locking the nozzle to the housing. When the sleeve is turned for locking the nozzle to the housing, the flat portion 57ª will move out of range of the flat portion 90. This flat portion 57ª is so dimensioned that the sleeve must be turned so as to firmly lock the nozzle to the housing before the shaft 87 can be turned for opening the valve 76. Assuming that the flat portion 57ª has been turned for locking the nozzle to the housing, then the valve can be opened and when the valve is turned to open position, the semi-circular projecting portion 89 on the collar 88 will lie in the path of movement of the projecting part of the sleeve carrying this flat section 57ª and the sleeve cannot be turned for disconnecting the same from the housing until the valve has been turned to fully seated position and the flat portion 90 of the collar placed as shown in Figure 5, thus permitting the sleeve to be turned. When the nozzle is detached from the housing, the lugs 73 on the keys which are moved endwise by the springs 65 will be seated in the notches 74 and therefore the outer sleeve 57 cannot be turned on the inner sleeve so as to move the flat portion 90 of the collar from its position opposed to the flat section 90 on the lug, and this will prevent any possible opening of the nozzle valve accidentally when the nozzle is detached from the tank housing.

When it is desired to fill the tank, the nozzle is attached to the housing and the sleeve turned to firmly secure the nozzle to the housing. Then the shaft controlling the nozzle valve is free to be turned so as to open the valve 76. As the valve is moved away from its seat, it is so dimensioned that it passes through the opening 11 and contacts with the valve 17 and lifts it from its seat, compressing the spring 20. After the valve is opened, then fluid under pressure is directed from the hose connected to the nozzle into the housing. This fluid pressure will of course maintain the valve 24 closed and it will lift the valve 35 so as to open the ports 30. The fluid will flow through the port 30 into the tank. Some of the fluid will pass through the opening 43 in the valve and into the pipe 45 when the passage 48 controlled by the float is opened. The passage 48 remains open until the tank is filled. When, however, the tank is filled to the point where the float is raised so as to close the port 48, then the chamber above the valve 35 will be a closed chamber and the fluid passing through the opening 43 will create a pressure upon the upper face of the valve 35 so that together with the pressure of the spring 20, the valve will move to closed position and the filling of the tank will thus be automatically stopped. When the valve 35 is closed, then the valve 76 may be closed and after it is closed, the nozzle may be detached. When the valve 76 is closed, the valve 17 will automatically return to its seated position as it is held open by the valve 76.

The broad principle of the fluid pressure controlled valve and the automatic closing of the same as shown in this application and described above is shown, described and claimed in my prior Patent No. 2,528,499, granted November 7, 1950, and further description of the operation thereof is not thought necessary.

One of the essential features of the present application is the means which has been provided for the emptying and draining of the tank, which means does not in any way disturb the automatic operation of the fluid pressure controlled valve. When it is desired to empty the tank, a nozzle is attached in the same manner as for filling, but the hose of course is not connected with a supply means but, rather, to a proper receptacle for receiving the contents of the tank for the drainage from the tank. After the nozzle has been attached, then the valve is opened by the turning of the shaft in a manner described above and this will open the valve 17. When the valve 17 is open, the lower portion of the housing will drain of any fluid contained therein and this will relieve the pressure bearing against the valve 24 and the seated valve will move to open position and permit the tank to drain its contents through the port 23 and the outlet passage 11 in the housing leading to the nozzle.

Attached to the shaft 87 for turning the same is a crank 91. The outer end of the crank is provided with a sleeve 92 and mounted in this sleeve is a locking pin 93. A handle member 94 has a limited movement in the sleeve 92 and is connected to the locking pin 93. Said pin extends beyond the crank arm 91 and is adapted to engage an opening 95 in a locking plate 96 when the crank arm is so positioned that the valve is closed. The locking plate 96 carries a stop 97 which limits the turning movement of the shaft for the closing of the valve and it is also provided with an inclined cam face 98 with which the pin contacts. This will raise the pin so that it bears against the plate and will drop into the opening 95 when the crank is brought to this position for the closing of the valve. This locking pin 93 positions the flat face 90 on the collar 88 so that it is in alignment with the flat face 57ᵃ on the lug 57 and thus permits the turning of the outer sleeve for releasing the nozzle.

When it is desired to open the valve, the handle 94 is lifted, withdrawing the pin, and then the shaft may be turned so as to force the valve to open position. Of course, this cannot be done when the nozzle is attached to the housing until the connection is completed and the face 57ᵃ of the sleeve 57 has moved out of engagement with the flat face on the collar. In order to lock the valve in open position, the crank arm 91 has an extension 99 provided with a handle member 100 carrying a pin 97. The locking plate has an inclined face 101 with which the pin makes contact and this will raise the pin and allow it to drop into the opening 99ᵃ when the shaft is turned so that the valve is in full open position. There is a stop 102 to limit any over-turning of the crank when opening the valve.

The means for securing the nozzle to the housing as well as the means for opening the nozzle valve together with the associated locking devices therefor may be used in connection with other types of housings and arrangements for controlling the filling and draining of a tank. It does, however, have a novel advantage in connection with the general arrangement of valve controlled drain ports and therefore the nozzle and its associated parts are claimed broadly in combination with other features for filling and draining the tank.

The nozzle per se is shown, described and claimed in my co-pending application Serial No. 754,302 filed June 12, 1947, now Patent No. 2,519,358, granted August 22, 1951.

The means described above for the filling and draining of the tank is particularly well adapted for defueling and refueling tanks in aircraft, particularly for tanks which are installed in the wings of the aircraft. In this case, the tank may be filled from a point below the wing thus making it unnecessary for the one servicing the plane to climb on to the wing and draw the filling hose across the upper face of the wing. When so used, it is preferable to place the housing within the tank and attach the same to the bottom wall of the tank. The housing attachment for the filling and draining of the tank may, however, be used in connection with tanks for other purposes than those just described.

It is obvious that minor changes in the details of construction and the arrangements of parts may be made without departing from the spirit of the invention as set forth in the appended claims.

I claim:

1. The combination of a housing adapted to be attached to a wall of a tank for the filling and draining of the same, said housing having an opening at the lower end thereof through which said tank may be filled and drained, a valve seat surrounding said opening, a valve disposed within the housing and normally closing said opening, said housing having a second valve seat disposed inwardly from the first named valve seat, ports in the housing leading to said tank above said second valve seat for the filling of the tank, and a normally closed valve adapted to engage said second valve seat for controlling said ports and separating the upper part of the housing from the lower part thereof, means for opening said last named valve for filling the tank, said housing between the valve seats having an opening leading directly to the tank for the draining thereof and a valve for closing said last named opening.

2. The combination of a housing adapted to be attached to a wall of a tank for the filling and draining of the same, said housing having an opening at the lower end thereof through which said tank may be filled and drained, a valve seat surrounding said opening, a valve disposed within the housing and normally closing said opening, said housing having a second valve seat disposed inwardly from the first named valve seat, ports in the housing leading to said tank above said second valve seat for the filling of the tank, and a fluid pressure operated valve adapted to engage said second valve seat for controlling said ports and separating the upper part of the housing from the lower part thereof, said housing between the valve seats having an opening leading directly to the tank for the draining thereof and a valve for closing said last named opening.

3. The combination of a housing adapted to be attached to a wall of a tank for the filling and draining of the same, said housing having an opening at the lower end thereof through which said tank may be filled and drained, a valve seat surrounding said opening, a valve disposed within the housing and normally closing said opening, said housing having a second valve seat disposed inwardly from the first named valve seat, ports in the housing leading to said tank above said second valve seat for the filling of the tank, and a normally closed valve adapted to engage said second valve seat for controlling said ports and separating the upper part of the housing from the lower part thereof, means for opening said last named valve for filling the tank, said housing between the valve seats having an opening leading directly to the tank for the draining thereof and a valve for closing said last named opening, said valve for closing the draining opening leading to the tank being mounted so as to move into said housing when opened, and a spring for closing the valve after draining of the tank is completed.

4. The combination of a housing adapted to be attached to a wall of a tank for the filling and draining of the same, said housing having an opening at the lower end thereof through which said tank may be filled and drained, a valve seat surrounding said opening, a valve disposed within the housing and normally closing said opening, said housing having a second valve seat disposed inwardly from the first named valve seat, ports in the housing leading to said tank above said second valve seat for the filling of said tank, and a fluid pressure operated valve adapted to engage said second valve seat for controlling said ports and separating the upper part of the housing from the lower part thereof, said housing between the valve seats having an opening leading directly to the tank for the draining thereof, a valve for closing said last named opening, a spring for holding the valve closed during filling, and a float controlled pilot valve associated with said fluid pressure operated valve for closing the same when the tank is filled.

5. The combination of a housing adapted to be attached to a wall of a tank for the filling and draining of the same, said housing having an opening at the lower end thereof through which said tank may be filled and drained, a valve seat surrounding said opening, a valve disposed within the housing and normally closing said opening, said housing having a second valve seat disposed inwardly from the first named valve seat, ports in the housing leading to said tank above said second valve seat for the filling of the tank, and a fluid pressure operated valve adapted to engage said second valve seat for controlling said ports and separating the upper part of the housing from the lower part thereof, said housing between the valve seats having an opening leading directly to the tank for the draining thereof and a valve for closing said last named opening, said valve for closing the draining opening being mounted so as to move into said housing when opened, and a spring for closing the valve after the draining of the tank is completed and for holding said valve closed during filling.

6. The combination of a housing adapted to be attached to a wall of a tank for the filling and draining of the same, said housing having an opening at the lower end thereof through which said tank may be filled and drained, a valve seat surrounding said opening, a valve disposed within the housing and normally closing said opening, said housing having a second valve seat disposed inwardly from the first named valve seat, ports in the housing leading to said tank above said second valve seat for the filling of the tank, and a fluid pressure operated valve adapted to engage said second valve seat for controlling said ports and separating the upper part of the housing from the lower part thereof, said housing between the valve seats having an opening leading directly to the tank for the draining thereof and a valve for closing said last named opening, and a float controlled pilot valve associated with said fluid pressure operated valve for closing the same when the tank is filled, said valve for closing the draining opening being mounted so as to move into said housing when opened, and a spring for closing the valve when the draining of the tank is completed and for holding the valve closed during filling.

7. The combination of a housing adapted to be attached to a wall of a tank for filling and draining the same, said housing having an opening through which the tank may be filled or drained, a valve disposed within said housing for controlling said opening, spring means for normally closing the valve, said housing having a valve seat disposed inwardly from said opening, ports in the housing above said valve seat for filling the tank, a fluid pressure-operated valve adapted to engage said valve seat for controlling said ports, said housing between the valves having an opening leading directly to the tank for the draining thereof, a spring closed valve opening into the housing for normally closing said last-named opening, a nozzle adapted to be detachably connected to the lower end of the housing at the filling and draining opening therein, and means disposed within said nozzle for engaging the first-named valve for moving the same away from its seat to facilitate the filling or draining of the tank.

8. The combination of a housing adapted to be attached to a wall of a tank for filling and draining the same, said housing having an opening through which the tank may be filled or drained, a valve disposed within said housing for controlling said opening, spring means for normally closing the valve, said housing having a valve seat disposed inwardly from said opening, ports in the housing above said valve seat for filling the tank, a fluid pressure-operated valve adapted to engage said valve seat for controlling said ports, said housing between the valves having an opening leading directly to the tank for the draining thereof, a spring closed valve opening into the housing for normally closing said last-named opening, a nozzle adapted to be detachably connected to the lower end of the housing at the filling and draining opening therein, said nozzle having a valve seat, a valve mounted within the nozzle, which valve is in alignment with the first-named valve in the housing and is dimensioned so as to pass through the filling and draining opening in the housing for engagement with said first-named valve for moving the same to opened position, and manually actuated means for moving the valve in the nozzle to opened or closed positions.

9. A device for filling tanks comprising a housing adapted to be inserted in an opening in a wall of the tank and having a flange attached to said wall, said housing having means for attachment of a supply nozzle and an opening through which the tank may be filled, an inwardly facing valve seat surrounding said opening, said housing having an inner portion extending into said tank, a valve disposed within said housing and adapted to engage said valve seat, said valve having a valve stem and means within the housing for guiding said valve stem, a spring surrounding said valve stem and adapted to move said valve to closed position, said housing having a partition disposed above said valve stem and dividing said housing into upper and lower chambers, said partition having an opening therethrough surrounded by a valve seat on its upper face, a fluid pressure operated valve located in said upper chamber and adapted to engage said valve seat for closing said opening, said housing having openings directly above said valve seat leading to the tank, said last named valve having a restricted passage therethrough so that fluid during filling will pass through said opening to the upper chamber, means associated with the housing and having an opening leading from the upper chamber to the tank, a float controlled pilot valve for closing said opening when the tank is filled to a desired level for creating a differential pressure on the fluid pressure operated valve which will close the same, said first named valve being adapted to automatically close when the supply of fluid is cut off and the nozzle disconnected so as to prevent dripping due to escape of fluid through the restricted opening in the fluid pressure operated valve.

10. A device for filling tanks comprising a housing adapted to be inserted in an opening in a wall of the tank and having a flange attached to said wall, said housing having means for attachment of a supply nozzle and an opening through which the tank may be filled, an inwardly facing valve seat surrounding said opening, said housing having an inner portion extending into said tank, a valve disposed within said housing and adapted to engage said valve seat, said valve having a valve stem and means within the housing for guiding said valve stem, a spring surrounding said valve stem and adapted to move said valve to closed position, said housing having a partition disposed above said valve stem and dividing said housing into upper and lower chambers, said partition having an opening therethrough surrounded by a valve seat on its upper face, a fluid pressure operated valve located in said upper chamber and adapted to engage said valve seat for closing said opening, said housing having openings directly above said valve seat leading to the tank, said last named valve having a restricted passage therethrough so that fluid during filling will pass through said opening to the upper chamber, means associated with the housing and having an opening leading from the upper chamber to the tank, a float controlled pilot valve for closing said opening when the tank is filled to a desired level for creating a differential pressure on the fluid pressure operated valve which will close the same, said first named valve being adapted to automatically close when the supply of fluid is cut off and the nozzle disconnected so as to prevent dripping due to escape of fluid through the restricted opening in the fluid pressure operated valve, a nozzle detachably connected to the housing at the filling opening therein, and means disposed within the nozzle for engaging the first-named valve for moving the same away from its seat to permit fluid to enter the housing for filling the tank.

ROBERT H. DAVIES.

REFERENCES CITED

The following references are of record in the file of this patent:

UNITED STATES PATENTS

| Number | Name | Date |
| --- | --- | --- |
| 269,886 | Semple | Jan. 2, 1883 |
| 295,691 | Tobey | Mar. 25, 1884 |
| 506,145 | Young | Oct. 3, 1893 |
| 1,160,441 | Packer | Nov. 16, 1915 |
| 1,787,916 | Polson | Jan. 6, 1931 |
| 2,112,146 | Giovanni | Mar. 22, 1938 |
| 2,203,922 | Paisley | June 11, 1940 |
| 2,225,838 | Miller | Dec. 24, 1940 |
| 2,384,628 | Krone | Sept. 11, 1945 |
| 2,413,571 | Krone | Dec. 31, 1946 |
| 2,458,245 | Bordelon | Jan. 4, 1949 |
| 2,461,312 | Dahlem | Feb. 8, 1949 |
| 2,477,186 | Koeler | July 26, 1949 |
| 2,528,499 | Davies | Nov. 7, 1950 |